UNITED STATES PATENT OFFICE 2,557,664

THIOPHENE PREPARATION FROM HYDROCARBON AND SULFUR DIOXIDE

Kenneth L. Kreuz, Evanston, Ill., assignor to The Texas Company, New York, N. Y., a corporation of Delaware No Drawing. Application May 1, 1946,
Serial No. 666,524

19 Claims. (Cl. 260—332.8)

This invention relates to the production of heterocyclic organic sulfur compounds, and especially to the production of thiophenes, i. e., thiophene itself and substituted thiophenes.

This application is a continuation-in-part of application Serial No. 570,464, filed December 29, 1944, now abandoned, which is a continuation-in-part of application Serial No. 556,905, filed October 2, 1944, now abandoned.

Various reactions have been proposed in the past for the production of heterocyclic sulfur compounds, such as thiophene and its homologues, but these reactions have been useful only for small scale laboratory preparations. The compounds of this series are found as impurities in coal-tar hydrocarbons of corresponding boiling points, but no practical methods have been developed for their removal from such hydrocarbons without chemical change. As a result, so far as known, up to the present time there has been no commercial source of this group of potentially important organic compounds.

It has been discovered in accordance with the invention that a thiophene compound, namely, a compound containing a thiophene nucleus, can be prepared by reacting an organic compound having an aliphatic chain of at least two carbon atoms with an oxide of sulfur in the vapor phase and in the presence of a heterocyclization catalyst. It has been found, for example, that by passing normal butane with sulfur dioxide in the vapor phase at a temperature above 700° F., for example between 700° F. and 1400° F., preferably between 900° F. and 1200° F., and especially from 1000° F. to 1100° F., over a catalyst of the type defined below at a relatively low space velocity thiophene is produced in excellent yields and may be recovered easily from the remainder of the products of the reaction.

The catalysts that have been found to be suitable for use in accordance with the invention are metal and metalloid oxides and sulfides that are stable under the reaction conditions. Although all the catalysts of this class that have been tested have been found to produce thiophene in important yields, it has been found that they vary considerably in value. A group of these catalysts comprise the familiar class of dehydrogenation catalysts. Dehydrogenation catalysts have been found to be especially valuable and these catalysts, therefore, are among the preferred catalysts for use in accordance with the invention. Typical dehydrogenation catalysts are the oxides of the metals of group VI of the periodic table, and the stable sulfides of these metals. Especially preferred dehydrogenation catalysts are chromia-alumina, molybdena-alumina and molybdenum sulfide-alumina catalysts.

An active group of catalysts may be defined as the oxides of elements whose sulfides are unstable under the reaction conditions and the sulfides of metals whose sulfides are stable sulfides under the reaction conditions. While several of the catalysts of this group are dehydrogenation catalysts, it includes valuable materials which are not regarded as dehydrogenation catalysts and which at best have slight, if any, value as catalysts in an ordinary dehydrogenation reaction where a hydrocarbon in vapor form is passed in contact with the catalyst at an elevated temperature. For example, silica and alumina are members of this class. Silica in gel form has been found to be an especially valuable catalyst for use in the production of thiophene.

With the foregoing general description in mind, those skilled in the art will be able to name a number of compounds coming within the scope of the definitions used. Thus, including the compounds previously mentioned, the definitions include such compounds as chromia, molybdena, vanadia, boria, titania, magnesia, silica, alumina, molybdenum sulfide, nickel sulfide, tungsten sulfide, cobalt sulfide, and tin sulfide. Two or more of these may be employed together as the catalyst; for example, alumina, which itself is not one of the more active catalysts, is valuable when employed in combination with any of the other oxides or sulfides. Catalysts comprising alumina may contain a major proportion of this compound; and in such cases the alumina may be regarded as a support as well as active material. The catalytic materials when more than one is used may simply be in admixture or they may be in chemical combination. For example, a mixed silica-alumina gel may be used and also an acid-treated active bentonitic clay which is composed essentially of chemically combined silica and alumina. The catalysts described are effective to direct the reaction toward the formation of heterocyclic sulfur and carbon compounds and therefore they are heterocyclization catalysts and will be so termed hereinafter.

The process of the invention is especially applicable to the production of thiophene itself or thiophene homolgues having acyclic substituents. To produce compounds of this class the charge material is preferably a saturated or unsaturated acyclic hydrocarbon having at least two aliphatic carbon toms in a chain or a mixture of organic compounds containing a substantial proportion of hydrocarbons of this type. Low molecular weight hydrocarbons, such as are produced in a petroleum refinery, constitute suitable charge stocks for the production of thiophene compounds of the type in question. Such mixtures need not be separated to obtain individual hydrocarbon compounds, but it is usually desirable to employ a narrow fraction composed essentially of hydrocarbons having the same number of carbon atoms. The best yields of thiophene are obtained when a narrow $C_4$ cut is employed, and the best yields of methylthiophenes are obtained when the charge stock is a narrow $C_5$ cut. As examples of other hydrocarbons that may be employed as charge stocks may be mentioned ethane, propane, propylene, butadiene, hexanes and heptanes. There appears to be no upper limit on the number of carbon atoms the compounds may contain, although they should be in vapor form under the reaction conditions. When relatively simple reaction products are desired, however, the hydrocarbons, preferably, should contain from two to ten carbon atoms.

The invention also includes processes in which substituted acyclic hydrocarbons having at least two aliphatic carbon atoms in the chain are employed as the charge materials. These compounds should contain substituents which either remain stably attached to the compound during the reaction or which are removed during the reaction to form compounds which do not have a substantial adverse effect on the reaction. As examples of suitable compounds there may be mentioned aryl-substituted acyclic hydrocarbons, such as ethyl, propyl or butyl benzene or naphthalene; halogenated aliphatic compounds, such as chlorobutane or chloropentane, and saturated or unsaturated aliphatic alcohols having at least two carbon atoms in a straight chain.

I prefer to employ sulfur dioxide as the sulfur oxide in the process but sulfur trioxide may also be used. These oxides are usually employed in the free state, but they may be employed in combined form such as in the form of their hydrates. The hydrates, for example, decompose at the reaction temperature to yield a charge mixture comprising the sulfur oxide and a hydrocarbon, together with steam, which serves as a diluent in the mixture.

The process of the invention is preferably carried out by mixing the sulfur dioxide in vapor form with the vaporized charge material and passing the mixed vapors in contact with the catalyst. When proceeding in this manner, the space velocity or charging rate (liquid volumes of charged compound per volume of catalyst per hour) and the mol ratio of sulfur dioxide to charged compounds are important factors.

It will be understood that the optimum conditions of reaction will vary with the particular type of charge material as well as with the type of catalytic conversion system used. In general, optimum space velocities will lie within the range of 0.3 to 10, with higher space velocities being employed with the higher molecular weight charge materials and at the higher temperatures. The mol ratio of sulfur dioxide to charge material should be at least 0.3 and, preferably, at least 0.5 for saturated charge stocks. Usually mol ratios between 1 and 3 are preferred for the majority of charge compounds. Examples of suitable and optimum conditions of operation in connection with the use of a chromia-alumina catalyst in a fixed bed operation may be helpful in understanding the invention.

When charging normal butane the space velocity should be within the range 0.3 to 4 and preferably should be 1 to 1.5; the mol ratio of sulfur dioxide to butane should be at least 0.5 and preferably 1.0 to 1.5; and the temperature should be 700° to 1400° F. and preferably 1100° F. On the other hand, when charging butene the space velocity should lie within the range 0.3 to 5 and preferably should be 1.5 to 2.0; the mol ratio of sulfur dioxide to butene should be at least 0.3 and preferably about 1.0 and the temperature should be 700° F. to 1400° F., and preferably about 1000° F. It will be understood that the conditions described as optimum are those which result in maximum production of thiophene in a once-through process. Where the hydrocarbon products are recycled it may be desirable to maintain other conditions during the reaction.

The catalyst life for optimum thiophene production will depend to some extent on the particular catalyst utilized, and on the charge stock and reaction conditions employed, but will generally be one or more hours. In any case, periodic determinations of thiophene yields will indicate the practical period of catalyst life before reactivation. When employing chromia-alumina catalysts and butane charge stocks, this period will usually be of the order of 2-8 hours, after which the thiophene yields will fall off sharply. The catalyst in this condition may be reactivated for thiophene production by conventional methods, as by burning off the deactivating catalyst deposits.

As previously indicated, the temperature of the reaction may be varied. It has been found that the temperature should be varied primarily depending upon the nature of the charge material and the other reaction conditions employed. Using the same catalyst, somewhat higher temperatures are generally desirable for low molecular weight charge stocks than are required for higher molecular weight charge stocks. Somewhat higher temperatures may be used when higher space velocities are used, and when low space velocities are employed lower temperatures are desirable.

The separation and recovery of thiophene may be easily accomplished. For example, reaction products may be passed through a cold caustic soda solution to dissolve sulfur compounds soluble in the solution and to condense a liquid material which initially may be intimately admixed with the solution. Upon permitting the solution to stand under quiescent conditions, it separates into two layers, one of which is a crude thiophene. A relatively pure thiophene or mixture of thiophenes may be recovered from the crude material by distillation.

The thiophene compounds may also be recovered in crude form by a simple condensation procedure which may involve passing the products into a cooled body of hydrocarbon oil such as kerosene, in which the thiophene condenses, and then distilling the mixture of thiophene and hydrocarbon oil to recover the thiophene. Unreacted sulfur oxides, hydrogen sulfide, and sulfur may be recovered from the reaction products by conventional methods and the reduced products may be reoxidized for recycling in the process.

It is evident that the process may be operated in accordance with any of the usual techniques for high temperature catalytic conversion. Thus, fixed catalyst beds may be used alternately in reaction and reactivation cycles fluid catalyst operation may be used, with continuous reactivation and recycle of a powdered catalyst; fluidized catalyst bed operation may be used in which the catalyst particles are in motion during the reaction process but remain essentially in the reaction zone during the alternate reaction and reactivation cycles.

The invention will be further illustrated by the following specific examples in which the process was conducted in a fixed bed reactor unless otherwise specified.

*Example I*

Normal butane and sulfur dioxide in a mol ratio of approximately 1.4 mols of sulfur dioxide per mol of butane were mixed, preheated to approximately reaction temperature, and charged to a catalytic reaction zone maintained at about 1100° F. and at atmospheric pressure. A freshly prepared catalyst was employed, comprising chromia-supported on activated alumina, and having the aproximate composition 10% $Cr_2O_3$ by weight and 90% $Al_2O_3$ by weight. The butane charge rate was approximately one volume of liquid butane per volume of catalyst per hour.

The reaction product from a run of 2¾ hours was fractionated to recover thiophene, which was obtained in a yield of 30.3% of the weight of the butane charge. Relatively large amounts of $C_4$ hydrocarbons in the product indicated that the yield in a continuous cyclic process would greatly exceed this single-pass yield.

*Example II*

The procedure of Example I was followed, using a freshly reactivated catalyst of the same composition as that of Example I. The catalyst had previously been employed in a number of similar runs and had been reactivated after each run by burning off the catalyst deposits.

During the first hour hours of operation with the reactivated catalyst, under the reaction conditions of Example I, the thiophene yield was 21.2% of the weight of the butane charge.

During the next two hours, the average yield of thiopene dropped to 5.9% of the weight of the butane charge.

*Example III*

A freshly prepared catalyst of the same composition as that of Example I was employed for the production of methyl-thiophenes from n-pentane and sulfur dioxide. The pentane charge rate was approximately one volume of liquid pentane per volume of catalyst per hour, and sulfur dioxide was simultaneously charged in approximately an equimolar amount. The temperature was about 1000° F. The reaction product was fractionated to obtain a normally liquid product amounting to approximately 30% of the weight of the pentane charge. The methyl-thiophene fraction of the liquid product appeared to be essentially 2-methyl-thiophene.

*Example IV*

This example was carried out in the same general manner as Example I but using isopentane as the charge material. The temperature was 1000° F., the space velocity was 1.6, and the mol ratio of sulfur dioxide to isopentane was 1.0 The yield of a thiophene was 10.5% on a once-through basis and the ultimate yield was indicated to be about 32.3%. The product contained 3-methyl-thiophene.

*Example V*

In this example the catalyst employed was a commercial hydrated silica gel. Before use the silica gel was dried at 250° F., ground to 6 to 30 mesh and calcined at 1000° F. for three hours.

Normal butane was passed in contact with this catalyst in general as described in Example I. The temperature was 1108° F., the space velocity was 1.0, and the mol ratio of sulfur dioxide to normal butane was 1.5. The yield of crude thiophene per pass was 30% and the indicated ultimate yield was 42%.

*Example VI*

The catalyst employed in this example was a vanadia-alumina catalyst prepared to contain about 5% $V_2O_5$ and about 95% $Al_2O_3$. The catalyst was prepared by dissolving 25 parts by weight of $V_2O_5$ in a solution containing 50 parts of oxalic acid and 500 parts of water, heating on a steam bath to effect the solution of the $V_2O_5$. The resulting solution was added a little at a time to 475 parts of 6-8 mesh alumina. The mixture formed was evaporated to dryness and calcined for six hours at 1000° F.

Normal butane was passed into contact with this catalyst as described in the preceding examples. The temperature was 1100° F., the space velocity was 1.0, and the mol ratio of sulfur dioxide to normal butane was 1.4. The yield of crude thiophene per pass was 26% and the indicated ultimate yield was 29%.

*Example VII*

The catalyst employed in this example was a catalyst prepared to contain about 12% of molybdenum sulfide ($MoS_3$) and about 88% of alumina. The catalyst was prepared by saturating a mixture of molybdena and alumina in proper proportions with distilled water and then passing a stream of hydrogen sulfide through the mixture until there was no further change in color. The catalyst was dried by passing a stream of city gas in contact therewith.

Normal butane was passed into contact with this catalyst in the manner described in the preceding examples. The temperature was 1098° F., the space velocity was 1.0, and the mol ratio of sulfur dioxide to normal butane was 1.0. The yield of crude thiophene per pass was 17% and the indicated ultimate yield was 24%.

*Example VIII*

The catalyst used in this example was the silica gel catalyst employed in Example V. The charge hydrocarbon was 2-butene and the general conditions of operation were as described in the previous examples. The temperature was 1009° F., the space velocity was 0.9, and the mol ratio of sulfur dioxide to 2-butene was 1.0. The yield of crude thiophene per pass was 22% and the indicated ultimate yield was 27%.

*Example IX*

This example was carried out exactly as described in Example VIII except that the chromia-alumina catalyst of Example I was used and the temperature was 1012° F. The yield of crude thiophene per pass based on the weight of 2-butene charged was 41% and the indicated ultimate yield was 46%.

*Example X*

The catalyst used in this example was an acid-treated, active clay. Normal butane was charged, the temperature was 1097° F., the space velocity was 1.0, and the mol ratio of sulfur dioxide to normal butane was 1.5. The yield of crude thiophene per pass was 10% and the indicated ultimate yield was 16%.

*Example XI*

The catalyst used in this example was a molybdenum oxide (MoO₃)-alumina in which sodium had been reduced to a minimum. It contained about 10 per cent molybdenum oxide and about 90 per cent alumina by weight. Normal butane was charged; the temperature was about 1100° F., the space velocity was 1.0, and the mol ratio of sulfur dioxide to normal butane was 1.5. The yield of crude thiophene per pass was 30.5 per cent and the indicated ultimate yield was 43.3%.

*Example XII*

Normal butane and sulfur dioxide in a mol ratio of approximately 1.6 mols of sulfur dioxide per mol of butane were mixed, preheated to approximately 1100° F., and charged to a fluidized fixed-bed reaction zone maintained at an average temperature of about 1100° F. and at substantially atmospheric pressure. A commercial pelleted chromia-alumina catalyst containing approximately 10 per cent chromia was employed. This catalyst was ground and screened and 500 grams of 100–200 mesh particles were charged to the reactor. The reaction was conducted at a space velocity of 1.7 volume of butane per volume of catalyst per hour (v./v./hr.).

Product samples were taken for two-hour intervals and the thiophene yields were found to remain essentially constant, about 32–35 per cent of the weight of the butane charge for eight hours. At this point the thiophene yields dropped appreciably and were 12 per cent and 0.1 per cent for the fifth and sixth two-hour intervals, respectively.

*Example XIII*

The chromia-alumina catalyst of Example XII was ground to 40–100 mesh and 250 grams charged to the fluidized fixed-bed catalytic reactor. Normal butane and sulfur dioxide were again fed to the reactor while maintaining the temperature of the reaction zone at about 1100° F. The mol ratio of sulfur dioxide to butane was 1.7. The space velocity was 5.1 and the run length was 80 minutes. The thiophene recovered represented a per pass conversion of butane of 47 per cent by weight.

*Example XIV*

The chromia-alumina catalyst of Example XII was charged to the fluidized fixed bed reactor and 2-butene was passed through the reactor while maintaining the temperature at about 1100° F. The space velocity was 1.7 and the sulfur dioxide to butene mol ratio was about 1.7. The thiophene yields remained essentially constant for three hours at a value of about 75 per cent of the weight of the butene charge.

*Example XV*

Ethylbenzene and sulfur dioxide in a mol ratio of approximately 1.5 mols of sulfur dioxide per mol of ethylbenzene were mixed, preheated to approximately reaction temperature, and charged to a fixed bed catalytic reaction zone maintained at an average temperature of about 1100° F. and at atmospheric pressure. The catalyst employed was a commercial pelleted chromia-alumina catalyst containing approximately 10 per cent chromia. The space velocity was 0.9 volumes of ethylbenzene per volume of catalyst per hour.

Upon fractionation a solid, identified by its characteristic ultraviolet absorption pattern to be essentially benzothiophene, was recovered which represented a 6.8 mol per cent conversion of ethylbenzene to this material.

It will be understood, of course, that these examples are merely illustrative of the invention and that other catalysts, charge stocks, and specific conditions may be employed as previously described. By using selected charge stocks thiophenes containing various substituents may be produced by the present process.

Obviously many modifications and variations of the invention as hereinbefore set forth may be made without departing from the spirit and scope thereof, and only such limitations should be imposed as are indicated in the appended claims.

I claim:

1. A process for the production of a compound possessing a thiophene nucleus which comprises passing sulphur dioxide and an organic compound having an aliphatic hydrocarbon chain of at least two carbon atoms in the vapor phase at a temperature in the range of about 700° F. and higher in contact with a solid particulate surface-active contact material in a reaction zone, effecting said contact at a space velocity in the range of about 0.3 to 5 volumes of organic compound per volume of catalyst per hour and at mol ratio of sulphur dioxide to organic compound of at least 0.3 such that substantial conversion of reactants into said thiophene compound occurs, and removing from the reaction zone products of reaction containing said thiophene compound in substantial amount.

2. The method according to claim 1 in which the organic compound reacted with sulphur dioxide is a hydrocarbon containing from two to ten carbon atoms.

3. The method according to claim 1 in which the organic compound reacted with sulphur dioxide is an aryl-substituted acyclic hydrocarbon.

4. A process for the production of a compound possessing a thiophene nucleus which comprises passing sulphur dioxide and an organic compound having an aliphatic hydrocarbon chain of at least two carbon atoms into a reaction zone containing a solid particulate surface-active contact catalyst, reacting said sulphur dioxide and said organic compound at a space velocity less than 10 volumes of organic compound per volume of catalyst per hour in the vapor phase at an elevated temperature of at least 700° F. to form said thiophene compound, and removing from said reaction zone products of reaction containing said thiophene, in a substantial amount.

5. A process according to claim 12 in which the solid particulate contact catalyst comprises a material selected from the group consisting of metal and metalloid oxides, sulfides and mixtures thereof stable under reaction conditions.

6. A process according to claim 12 in which the reaction is effected at a temperature between 900 and 1200° F.

7. A process for the production of a compound possessing a thiophene nucleus which comprises passing sulphur dioxide and an organic compound containing an aliphatic hydrocarbon chain of at least two carbon atoms at a space velocity of 0.3 to 10 volumes of organic compound per volume of catalyst per hour, into a reaction zone containing a catalyst selected from the group consisting of metal and metalloid oxides, sulfides and mixtures thereof stable under reaction conditions reacting said sulphur dioxide and organic compound in the vapor phase at an elevated temperature of 700° F. to form said thiophene compound, and removing from said reaction zone products of reaction containing said thiophene compound in substantial amount.

8. A process according to claim 7 in which the reaction is effected at a temperature between 900 and 1200° F.

9. A process according to claim 7 in which the catalyst comprises a group VI metal oxide supported on a surface-active material.

10. A process according to claim 7 in which the catalyst is a group VI metal sulfide supported on a surface-active material.

11. A process according to claim 7 in which the organic compound is an aliphatic hydrocarbon containing from 2 to 10 carbon atoms.

12. The process for the production of a thiophene which comprises reacting in the vapor phase sulfur dioxide and a hydrocarbon having a straight chain of at least four carbon atoms at an elevated temperature of at least 700° F. in the presence of a solid particulate surface-active catalyst at a space velocity less than about 5, and recovering a thiophene from the reaction products.

13. The process for the production of a thiophene which comprises reacting sulfur dioxide and a hydrocarbon having an aliphatic straight chain of at least four carbon atoms in vapor phase at an elevated temperature of at least 700° F. in the presence of a solid particulate surface-active dehydrogenation catalyst at a space velocity less than 5, and recovering a thiophene from the reaction products.

14. The process for the production of a thiophene which comprises reacting sulfur dioxide and a hydrocarbon having a straight chain of at least four carbon atoms in vapor phase at an elevated temperature within the range 700° F. to 1400° F. in the presence of a solid particulate surface-active dehydrogenation catalyst at a space velocity less than 5, and recovering a thiophene from the reaction products.

15. The process for the production of a thiophene which comprises passing sulfur dioxide and a hydrocarbon having an aliphatic straight chain of at least four carbon atoms in proportions corresponding to a mol ratio of sulfur dioxide to said organic compound of at least 0.3 in vapor phase and at an elevated temperature of at least 700° F. in contact with a solid particulate surface-active catalyst selected from the group consisting of metal and metalloid oxides and sulfides stable under reaction conditions, at a space velocity between 0.3 and 5 to form reaction products comprising a thiophene, and recovering a thiophene from the reaction products.

16. The process for the production of a thiophene which comprises passing sulfur dioxide and a hydrocarbon containing four to ten carbon atoms and having a straight chain of at least four carbon atoms in proportions corresponding to a mol ratio of sulfur dioxide to said hydrocarbon of at least 0.3 in vapor phase and at an elevated temperature within the range 900° to 1200° F. in contact with a dehydrogenation catalyst selected from the group consisting of metal and metalloid oxides and sulfides stable under reaction conditions, at a space velocity of 0.3 to 5, and recovering a thiophene from the reaction products.

17. A process in accordance with claim 16 in which the dehydrogenation catalyst comprises chromium oxide and alumina.

18. A process in accordance with claim 16 in which the dehydrogenation catalyst comprises molybdenum oxide and alumina.

19. A process in accordance with claim 16 in which the dehydrogenation catalyst comprises molybdenum sulfide and alumina.

KENNETH L. KREUZ.

REFERENCES CITED

The following references are of record in the file of this patent:

UNITED STATES PATENTS

| Number | Name | Date |
| --- | --- | --- |
| 2,126,817 | Rosen | Aug. 16, 1938 |
| 2,370,513 | Amos | Feb. 27, 1945 |
| 2,402,891 | Hooker | June 25, 1946 |
| 2,418,374 | Stone | Apr. 1, 1947 |

Certificate of Correction

Patent No. 2,557,664 June 19, 1951

KENNETH L. KREUZ

It is hereby certified that error appears in the printed specification of the above numbered patent requiring correction as follows:

Column 2, line 54, for "toms" read *atoms*; column 5, line 43, for "hour" read *four*; column 8, lines 59 and 64, for the claim reference numeral "12" read *4*;

and that the said Letters Patent should be read as corrected above, so that the same may conform to the record of the case in the Patent Office.

Signed and sealed this 11th day of September, A. D. 1951.

[SEAL]

THOMAS F. MURPHY,
*Assistant Commissioner of Patents.*